US008307327B2

(12) United States Patent
Delima et al.

(10) Patent No.: US 8,307,327 B2
(45) Date of Patent: Nov. 6, 2012

(54) USING CUSTOMIZABLE TEMPLATES TO RETRIEVE AND DISPLAY A SYSTEM CONFIGURATION TOPOLOGY GRAPH

(75) Inventors: Roberto Delima, Apex, NC (US); Ronald P. Doyle, Raleigh, NC (US); Michael F. Gering, Hillsborough, NC (US); Yongcheng Li, Cary, NC (US)

(73) Assignee: Internationanl Business Machines Corporation, Armonk, NY (US)

( * ) Notice: Subject to any disclaimer, the term of this patent is extended or adjusted under 35 U.S.C. 154(b) by 1412 days.

(21) Appl. No.: 11/924,312

(22) Filed: Oct. 25, 2007

(65) Prior Publication Data
US 2009/0113383 A1    Apr. 30, 2009

(51) Int. Cl.
*G06F 9/44* (2006.01)
(52) U.S. Cl. .................. 717/105; 717/109; 717/111
(58) Field of Classification Search ........... 717/105–113
See application file for complete search history.

(56) References Cited

U.S. PATENT DOCUMENTS

| | | | | |
|---|---|---|---|---|
| 5,825,361 A * | 10/1998 | Rubin et al. | ................... | 715/839 |
| 7,356,679 B1 * | 4/2008 | Le et al. | ............................ | 713/1 |
| 7,765,521 B2 * | 7/2010 | Bryant | ........................... | 717/103 |
| 2002/0016955 A1 * | 2/2002 | Matsuo | ............................ | 717/2 |
| 2002/0109717 A1 * | 8/2002 | Li et al. | ......................... | 345/744 |
| 2005/0085937 A1 * | 4/2005 | Goodwin et al. | ............. | 700/107 |
| 2007/0162892 A1 * | 7/2007 | Zenz et al. | .................... | 717/121 |
| 2009/0094616 A1 * | 4/2009 | Delima et al. | ................ | 719/316 |

OTHER PUBLICATIONS

Vassiliadis et al., A generic and customizable frameworkfor the design of ETL scenarios; 2005, www.elsevier.com/locate/infosys; pp. 492-525.*
Duby, Accelerating Embedded Software Development with a Model Driven Architecture®; Pathfinder Solutions; Sep. 2003; pp. 1-6.*

* cited by examiner

*Primary Examiner* — Wei Zhen
*Assistant Examiner* — Satish Rampuria
(74) *Attorney, Agent, or Firm* — Cuenot, Forsythe & Kim, LLC

(57) ABSTRACT

A method, system, and computer program product for implementing a customizable visual configuration (VC) template to retrieve and display a working set of system configuration objects. The computer-implementable method includes selecting a current system configuration object. Once a system configuration object is selected, a VC utility examines all available VC templates. The VC utility displays available VC templates whose starting configuration object matches the selected current system configuration object. In response to a selected VC template, the VC utility retrieves and displays system configuration objects defined by the selected VC template.

9 Claims, 6 Drawing Sheets

```
<templates name="WAS Server Data Source"
   description="Server->JDBCProvider->DataSource"
   start="//@templates.4/@objectTemplates.0"/>
<objectTemplates name="Server" typePattern="WebSphere\.Server">
   <relationships nextObjectTemplate="//@templates.4/@objectTemplates.1"/>
</objectTemplates>
<objectTemplates name="JDBCProvider" typePattern="WebSphere\.JDBCProvider">
   <relationships nextObjectTemplate="//@templates.4/@objectTemplates.2"/>
</objectTemplates>
<objectTemplates name="DataSource" typePattern="WebSphere\.DataSource"/>
</templates>
```

USING CUSTOMIZABLE TEMPLATES TO RETRIEVE AND DISPLAY A SYSTEM CONFIGURATION TOPOLOGY GRAPH

BACKGROUND OF THE INVENTION

The present disclosure relates to the field of computers, and specifically to visual configuration (VC) tools. Still more specifically, the present disclosure relates to the use of customizable VC templates.

System configuration is one of the most critical jobs of Information Technology (IT) system management, particularly for complex systems. A significant number of system problems and failures are the result of system configuration, which can include configuration problems as applied to middleware. As a result, much time and monetary resources are expended in diagnosing and fixing system misconfigurations.

BRIEF SUMMARY OF THE INVENTION

A computer-implementable method, system, and computer-readable medium for implementing a customizable visual configuration (VC) template for the retrieval and display of a working set of system configuration objects. The computer-implementable method includes selecting a current system configuration object. Once a system configuration object is selected, a VC utility examines all available VC templates. The VC utility displays available VC templates whose starting configuration object matches the selected current system configuration object. In response to a selected VC template, the VC utility retrieves and displays system configuration objects defined by the selected VC template.

The above as well as additional objectives, features, and advantages of the present invention will become apparent in the following detailed written description.

BRIEF DESCRIPTION OF THE SEVERAL VIEWS OF THE DRAWINGS

The invention itself will best be understood by reference to the following detailed description of an illustrative embodiment when read in conjunction with the accompanying drawings, where:

FIG. 3 is an exemplary customizable visual configuration (VC) template that is useful for understanding the invention;

DETAILED DESCRIPTION OF THE INVENTION

Figure 1:
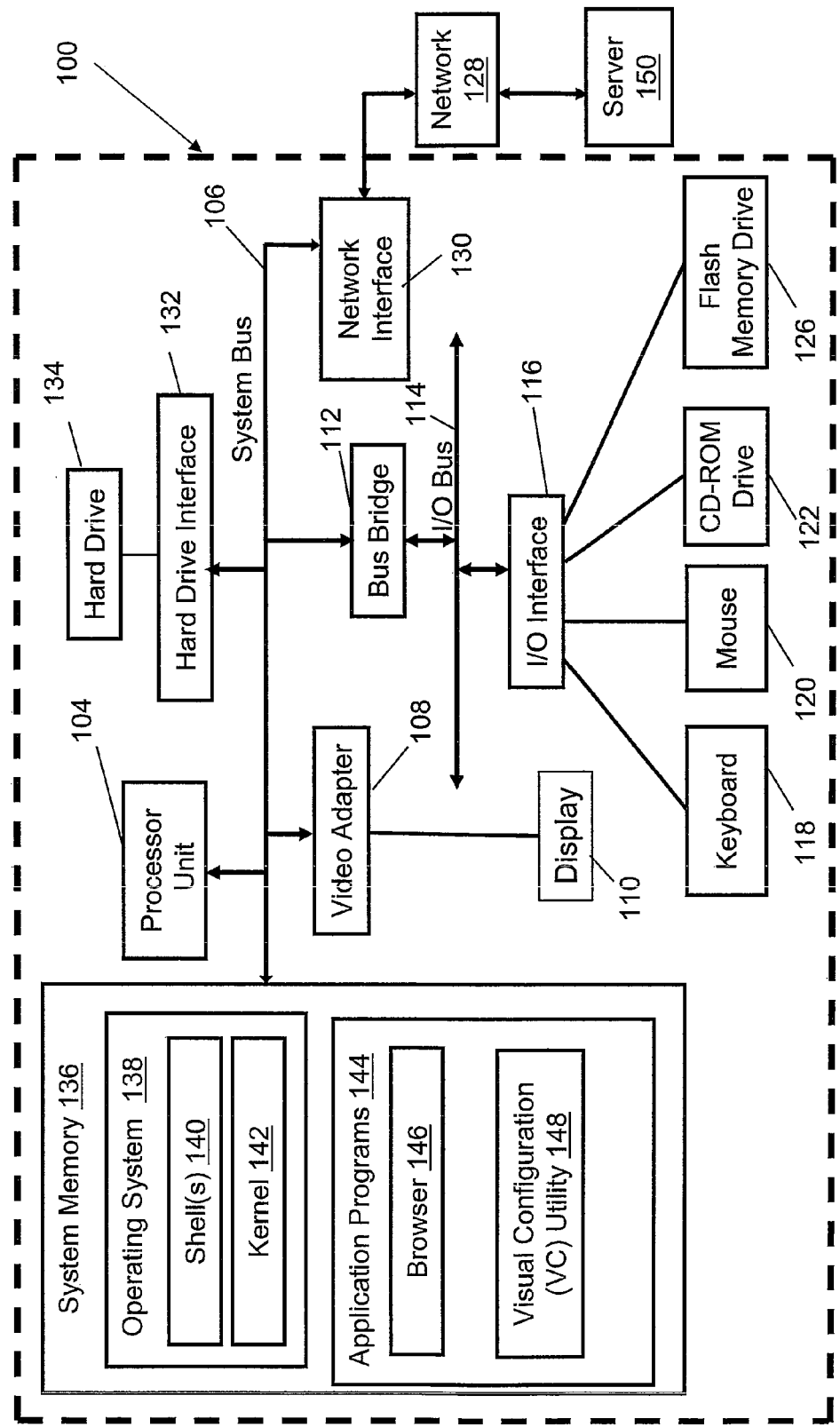
FIG. 1 depicts an exemplary computer in which the present invention may be implemented.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java® (JAVA is a trademark or registered trademark of Sun Microsystems, Inc. in the United States and other countries), Smalltalk® (SMALLTALK is a trademark or registered trademark of Cincom Systems, Inc.), C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

With reference now to the figures, and in particular to FIG. 1, there is depicted a block diagram of an exemplary computer 100, with which the present invention may be utilized. Computer 100 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, and a flash memory drive 126. The format of the ports connected to I/O interface 116 may be any known to those skilled in the art of computer architecture, including but not limited to Universal Serial Bus (USB) ports.

Computer 100 is able to communicate with a server 150 via a network 128 using a network interface 130, which is coupled to system bus 106. Network 128 may be an external network such as the Internet, or an internal network such as an Ethernet or a Virtual Private Network (VPN). Server 150 may be architecturally configured in the manner depicted for computer 100.

A hard drive interface 132 is also coupled to system bus 106. Hard drive interface 132 interfaces with a hard drive 134. In one embodiment, hard drive 134 populates a system memory 136, which is also coupled to system bus 106. System memory 136 is defined as a lowest level of volatile memory in computer 100. This volatile memory may include additional higher levels of volatile memory (not shown), including, but not limited to, cache memory, registers, and buffers. Code that populates system memory 136 includes an operating system (OS) 138 and application programs 144.

OS 138 includes a shell 140, for providing transparent user access to resources such as application programs 144. Generally, shell 140 (as it is called in UNIX® (UNIX is a registered trademark of The Open Group in the United States and other countries)) is a program that provides an interpreter and an interface between the user and the operating system. Shell 140 provides a system prompt, interprets commands entered by keyboard 118, mouse 120, or other user input media, and sends the interpreted command(s) to the appropriate lower levels of the operating system (e.g., kernel 142) for processing. As depicted, OS 138 also includes kernel 142, which includes lower levels of functionality for OS 138. Kernel 142 provides essential services required by other parts of OS 138 and application programs 144. The services provided by kernel 142 include memory management, process and task management, disk management, and I/O device management.

Application programs 144 include a browser 146. Browser 146 includes program modules and instructions enabling a World Wide Web (WWW) client (i.e., computer 100) to send and receive network messages to the Internet. Computer 100 may utilize HyperText Transfer Protocol (HTTP) messaging to enable communication with server 150. Application programs 144 in system memory 136 also include a Visual Configuration (VC) Utility 148. VC utility 148 performs the functions illustrated below in FIG. 6, and may include all logic, helper functions, databases and other resources depicted below in FIG. 3.

The hardware elements depicted in computer 100 are not intended to be exhaustive, but rather represent and/or highlight certain components that may be utilized to practice the present invention. For instance, computer 100 may include alternate memory storage devices such as magnetic cassettes, Digital Versatile Disks (DVDs), Bernoulli cartridges, and the like. These and other variations are intended to be within the spirit and scope of the present invention.

Figure 2:
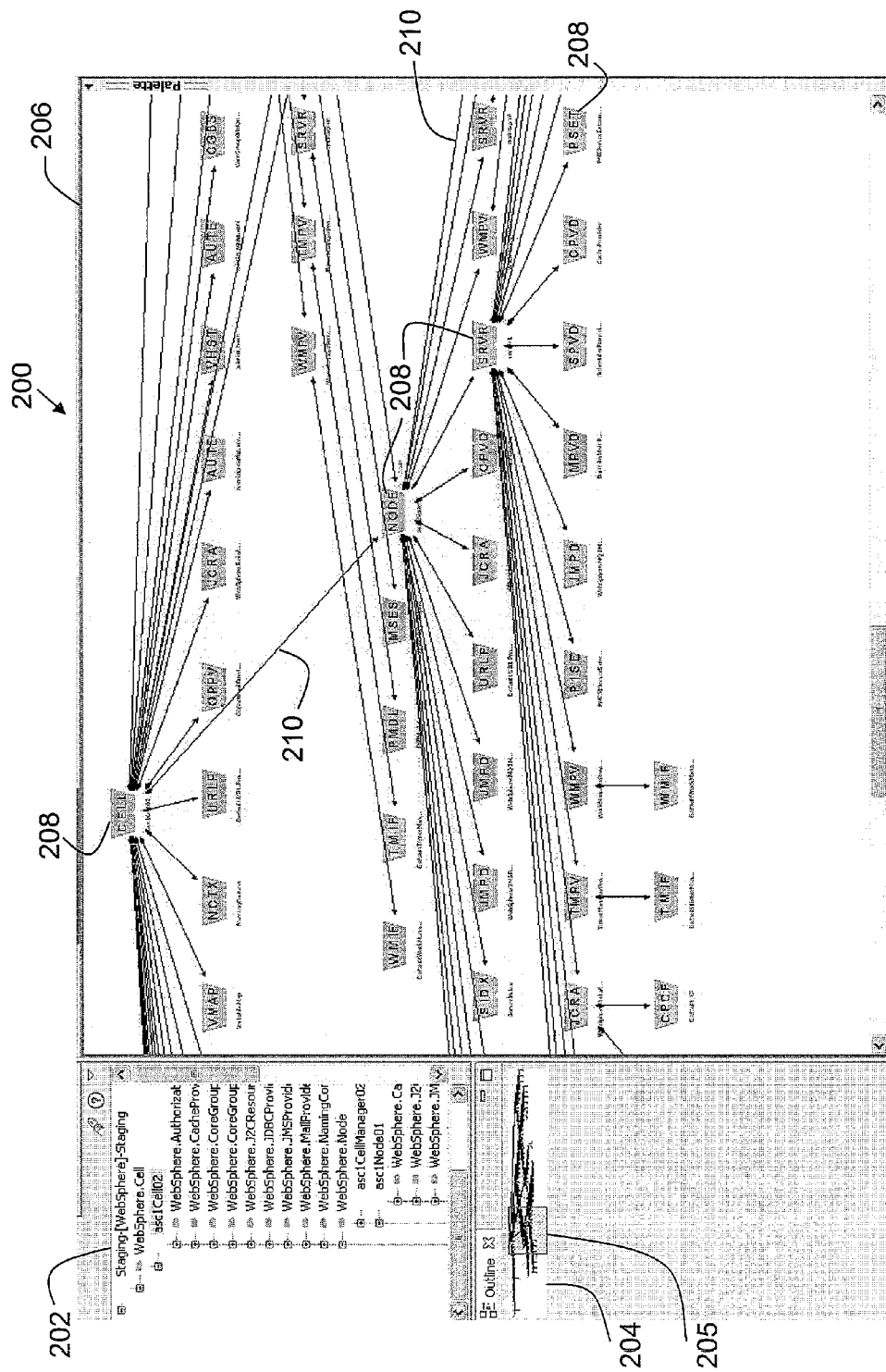
FIG. 2 is a graphical representation of a topology-based graph of an exemplary system configuration according to an embodiment of the present invention.

Referring now to FIG. 2, a graphical representation 200 of a conventional exemplary system configuration is shown. For exemplary purposes, the system configuration that is represented is one of an application server installation. Graphical representation 200 includes an object directory window 202, a high-level tree window 204 of object directory 202, and a main display window 206. Main display window 206 shows a zoomed view of a selected subset 205 of the system configuration (shown in tree window 204). Main display window includes a set of interconnected nodes 208 that are arranged in a hierarchical tree and connected by links 210. Node 208 represents a configuration object and link 210 represents the relationship between two nodes 208. VC utility 148 (FIG. 1) organizes system configuration data by partitioning the system configuration data and associating each partition to an object. A configuration object is an aggregation of configuration items. Taken together, a topology-based node represents a configuration object which contains multiple configuration items. As can be appreciated by someone of ordinary skill in the art of configuration management, not all nodes and links displayed in FIG. 2 are needed to diagnose and repair a system misconfiguration. Moreover, there may be other nodes and links which are required for diagnosis and repair, but cannot be quickly identified and displayed using a conventional zoomed view feature as shown.

Referring now to FIG. 3, a textual representation of an exemplary customizable visual configuration (VC) template 300 is shown. VC template 300 includes a working set of configuration objects, as well as the relationship(s) between configuration objects of the working set. According to one embodiment, VC template 300 defines a subset of a middleware configuration. Within VC template 300, a user can define (a) a VC template name 302 associated with VC template 300, (b) a description 304 of VC template 300, and (c) a starting configuration object 306. At runtime, when the user applies the template to a starting configuration object 306, VC utility 148 (FIG. 1) constructs a sub-graph (shown below in FIG. 5) based on the configuration objects and relationship(s) defined in VC template 300.

According to the example illustrated in FIG. 3, VC utility 148 applies VC template 300 (e.g., "WAS Server Data Source") to starting configuration object 306 (e.g., named "Server", which is of type "WebSphere.Server"). WEB- SPHERE® is a trademark or registered trademark of International Business Machines in the United States and other countries. As a result of applying VC template 300, VC utility 148 retrieves the working set of configuration objects, which includes the starting configuration object and all associated configuration objects. This includes all Java DataBase Connectivity (JDBC) Provider (JDPV) associated configuration objects contained within starting configuration object, Server (SRVR), as well as all Datasource (DTSC) associated configuration objects, which are in turn contained within JDPV configuration objects. JDBC® is a trademark or registered trademark of Sun Microsystems, Inc. As used herein, an associated configuration object is a configuration object that has a relationship defined to the configuration object under consideration. For example, when considering an object of "WebSphere.Server" type, all associated configuration objects of type "WebSphere.JDBCProvider" will be added to the sub-graph. Moreover, for each configuration object of "WebSphere.JDBCProvider" type, all associated configuration objects of type "WebSphere.DataSource" are added to the sub-graph to be displayed.

It is important to note that although the WebSphere® application/middleware server is used in the exemplary embodiment discussed herein, the invention is not limited in this regard. Moreover, other application/middleware technologies that can be employed include, but are not limited to: WebLogic® (WEBLOGIC is a trademark or registered trademark of BEA Systems, Inc. in the United States or other countries), JBoss® (JBOSS is a trademark or registered trademark of Red Hat, Inc. in the United States or other countries), Apache Geronimo™ (APACHE GERONIMO is a trademark of The Apache Software Foundation in the United States or other countries), and Oracle® OC4J™ (ORACLE and OC4J are trademarks or registered trademarks of Oracle Corporation in the United States or other countries).

Figure 4:
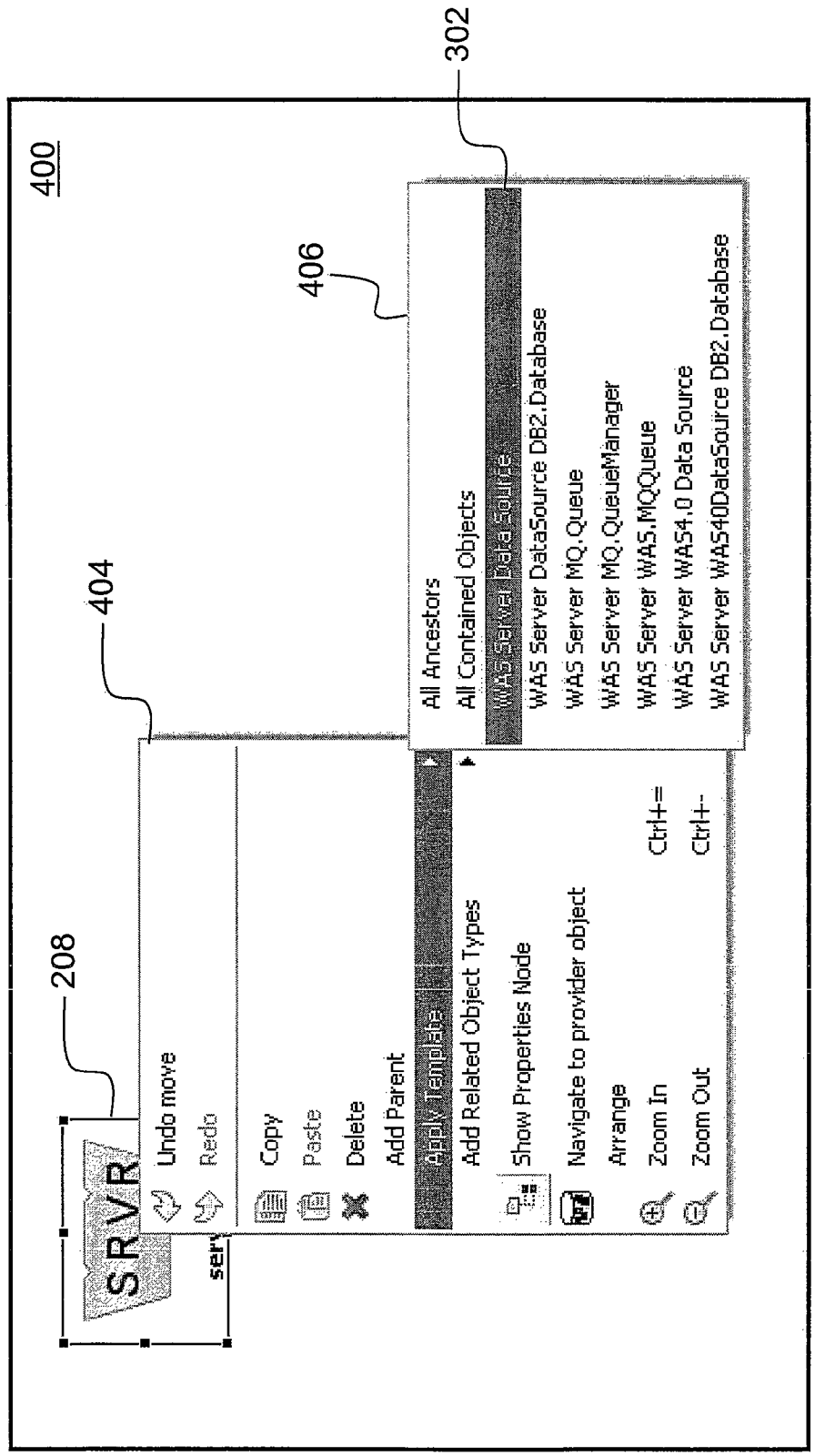
FIG. 4 is a pictorial representation of the exemplary step of applying a customizable VC template to a selected configuration object.

With reference now to FIG. 4, once one or more VC templates 300 (FIG. 3) have been customized to include a working set of configuration objects, a user applies VC template 300 to a selected configuration object (e.g., SRVR node 208 of FIG. 2), as displayed in object node selection window 400. According to the example illustrated in FIG. 4, the user hovers a mouse cursor (not shown) over SRVR node 208 and performs a right-click function, which prompts a right-click menu options display window 404 to appear. Within display window 404, a user can select an option titled "Apply Template", which in turn, prompts the display of a drop-down list 406 of VC template names 302 (FIG. 3) whose VC template 300 can be applied to selected SRVR node 208. In the example shown, VC template name 302 titled "WAS Server Data Source" is selected, which corresponds to the exemplary customized VC template 300 shown in FIG. 3. It should be appreciated that the exemplary VC template 300 is not the only type of template that can be implemented. Other customizable VC templates can be applied, which include outputting: all configuration objects that are contained within the starting configuration object (e.g., "All Contained Objects" VC template) and/or all configuration objects that are ancestors to the starting configuration object (e.g., "All Ancestors" VC template).

Figure 5:
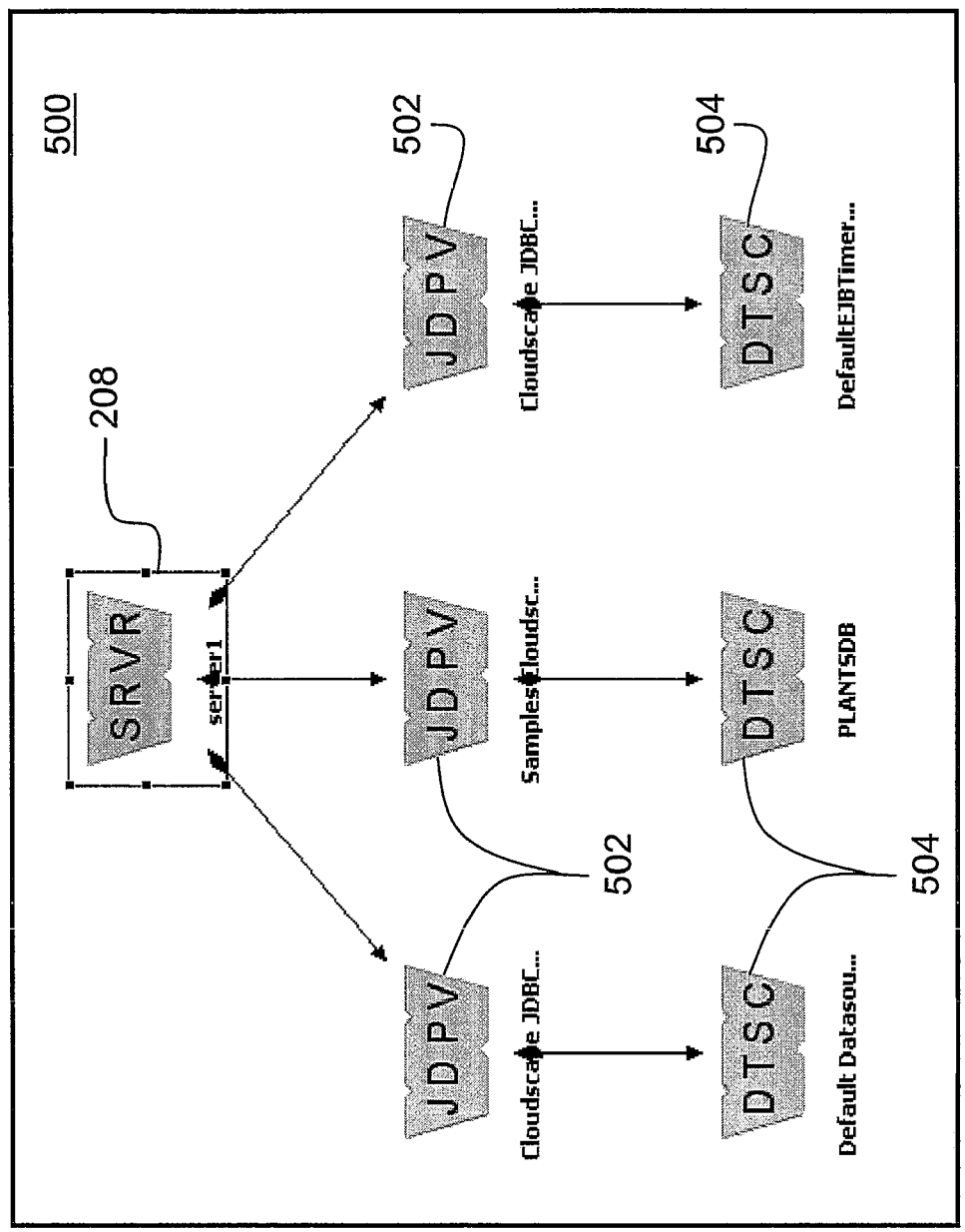
FIG. 5 is a graphical representation of a topology-based graph according to the embodiment of the present invention.

Referring now to FIG. 5, a working set of configuration objects based on a selected VC template (e.g., "WAS Server Data Source") is shown in working set display 500. As used herein, a working set of configuration objects are those system configuration objects which are of interest, and hence, are displayed to a user. In this regard, all other configuration objects which are not required for the diagnosis and repair of a system configuration are excluded from the working set. For example, FIG. 5 shows selected SRVR node 208 (FIG. 2). Within SRVR node 208, the working set also includes JDPV nodes 502, which in turn, are connected to DTSC nodes 504.

Figure 6:
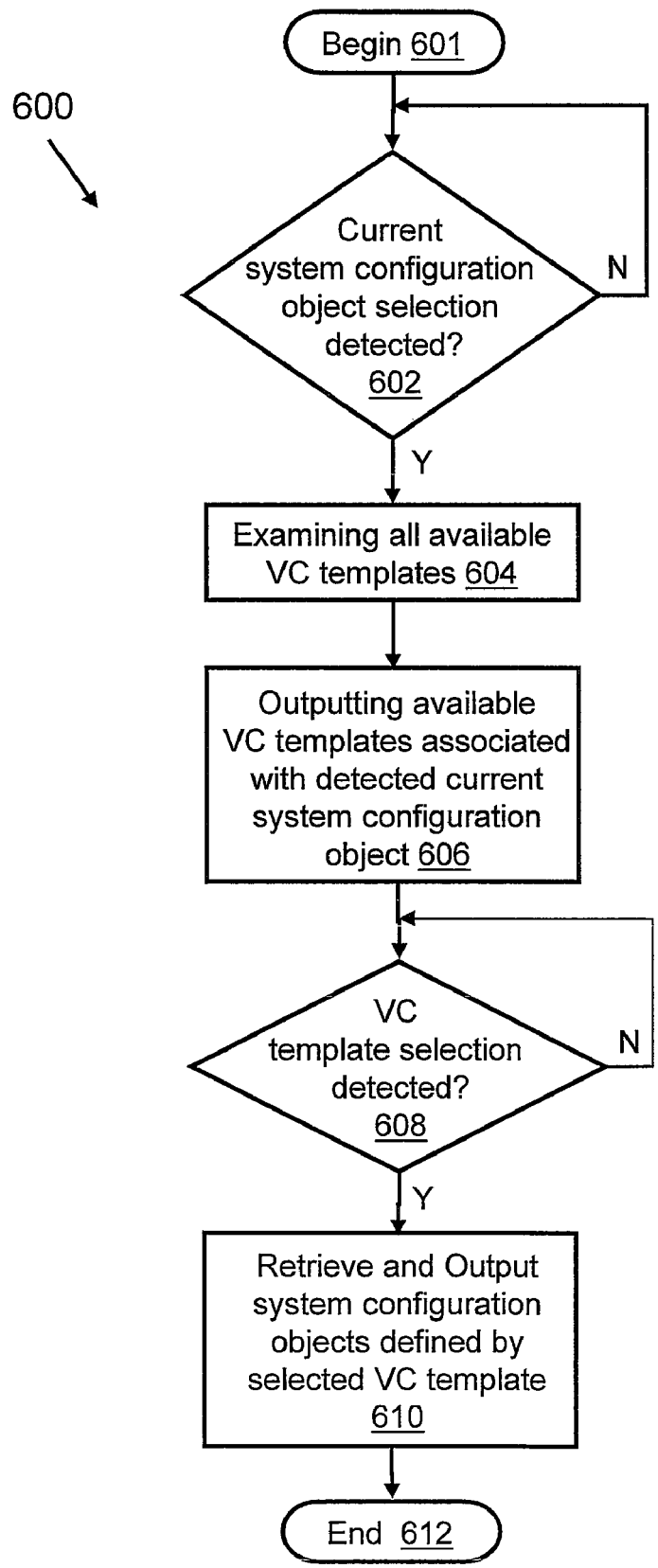
FIG. 6 is a high-level flow-chart of exemplary method steps taken to implement a customizable visual configuration (VC) template for the retrieval and display of a working set of system configuration objects.

As described in exemplary manner below, the present invention provides for a method for implementing a customizable VC template for the retrieval and display of a working set of system configuration objects. With reference now to FIG. 6, a high-level flow-chart 600 of the method is shown. After initiator block 601, VC utility 148 (FIG. 1) awaits detection of a system configuration object selection (decision block 602). The system configuration object is selected by a user from among a set of system configuration objects (i.e., nodes 208 of FIG. 2) displayed in main display window 206 (FIG. 2). The method 600 waits at decision block 602 until a user selection of the configuration object (e.g., SRVR node 208 of FIGS. 2 and 4) occurs, and then proceeds to block 604.

At block 604, all available VC templates are examined by VC utility 148. The VC templates are pre-customized by the user. Within a VC template, a user can define the template's: (a) name, (b) description (i.e., associated configuration object and the relationship to other configuration objects), and (c) starting configuration object. Moreover, VC templates are editable by a user. In this regard, a text editor or a graphical editor can be used for editing a VC template. Once all available VC templates have been examined by VC utility 148, VC utility 148 outputs (e.g., displays) the available VC templates associated with the system configuration object that has been selected, as depicted in block 606 and illustrated in FIG. 4. In particular, VC utility 148 displays only those VC templates whose starting configuration object matches the configuration object that is selected.

At decision block 608, VC utility 148 detects a VC template selection by a user. The method 600 waits at decision block 608 until a VC template selection (e.g., WAS Server Data Source) occurs, and then proceeds to block 610. At block 610, VC utility 148 retrieves the system configuration objects defined by the customized VC template that is selected, and outputs the defined objects to working set display 500 (FIG. 5). The method ends at terminator block 612.

Note that the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method for implementing a customizable visual configuration (VC) template for the retrieval and display of a working set of system configuration objects, the method comprising:
    detecting a selected system configuration object;
    outputting at least one customizable visual configuration (VC) template associated with the selected system configuration object;
    detecting a selected VC template;
    retrieving at least one system configuration object defined by the selected VC template;
    outputting the at least one system configuration object defined by the selected VC template;
    examining available VC templates in response to the detecting of the selected system configuration object; and
    displaying the VC template having a starting configuration object that matches the selected system configuration object.

2. The method of claim 1, wherein
    the customizable VC template defines a VC template name associated with the VC template, a description of the VC template, and a starting configuration object.

3. The method of claim 1, wherein
    the VC template defines a subset of a middleware configuration.

4. A computer program product comprising a computer usable storage device having stored therein computer usable program code for implementing a customizable visual configuration (VC) template for the retrieval and display of a working set of system configuration objects, the computer usable program code, which when executed by a computer hardware system, causes the computer hardware system to perform:
    detecting a selected system configuration object;
    outputting at least one customizable visual configuration (VC) template associated with the selected system configuration object;
    detecting a selected VC template;
    retrieving at least one system configuration object defined by the selected VC template;
    outputting the at least one system configuration object defined by the selected VC template;
    examining available VC templates in response to the detecting of the selected system configuration object; and
    displaying the VC template having a starting configuration object that matches the selected system configuration object.

5. The computer program product of claim 4, wherein
    the customizable VC template defines a VC template name associated with the VC template, a description of the VC template, and a starting configuration object.

6. The computer program product of claim 4, wherein
    the VC template defines a subset of a middleware configuration.

7. A computer system comprising:
    a processor unit;
    a memory coupled to the processor unit; and
    a visual configuration (VC) utility executing on the processor unit and having executable code for:
        detecting a selected system configuration object;
        outputting at least one customizable visual configuration (VC) template associated with the selected system configuration object;
        detecting a selected VC template;
        retrieving at least one system configuration object defined by the selected VC template;
        outputting the at least one system configuration object defined by the selected VC template;
        examining available VC templates in response to the detecting of the selected system configuration object; and
        displaying the VC template having a starting configuration object that matches the selected system configuration object.

8. The computer system of claim 7, wherein
    the customizable VC template defines a VC template name associated with the VC template, a description of the VC template, and a starting configuration object.

9. The computer system of claim 7, wherein the VC template defines a subset of a middleware configuration.

* * * * *